US009374507B2

(12) United States Patent
Robertson et al.

(10) Patent No.: US 9,374,507 B2
(45) Date of Patent: Jun. 21, 2016

(54) METHOD TO IMPROVE ACCURACY AND RELIABILITY OF MOTION ESTIMATED WITH PHASE CORRELATION

(71) Applicant: SONY CORPORATION, Tokyo (JP)

(72) Inventors: Mark Robertson, Cupertino, CA (US); Ming-Chang Liu, San Jose, CA (US); Yoshihiro Murakami, Atsugi (JP); Toru Kurata, Ageo (JP); Yutaka Yoneda, Izumi ward Yokohama (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 14/315,106

(22) Filed: Jun. 25, 2014

(65) Prior Publication Data

US 2014/0307120 A1 Oct. 16, 2014

Related U.S. Application Data

(62) Division of application No. 12/912,587, filed on Oct. 26, 2010, now Pat. No. 8,792,559.

(51) Int. Cl.
H04N 7/12 (2006.01)
H04N 5/14 (2006.01)
H04N 19/61 (2014.01)
H04N 19/51 (2014.01)
H04N 19/176 (2014.01)
G06T 7/20 (2006.01)
H04N 5/235 (2006.01)
H04N 19/523 (2014.01)
(Continued)

(52) U.S. Cl.
CPC ............. H04N 5/144 (2013.01); G06T 7/206 (2013.01); G06T 7/2026 (2013.01); H04N 5/235 (2013.01); H04N 7/26244 (2013.01); H04N 7/364 (2013.01); H04N 7/462 (2013.01); H04N 7/50 (2013.01); H04N 19/521 (2014.11); H04N 19/523 (2014.11); H04N 19/547 (2014.11); G06T 2207/10016 (2013.01); H04N 7/26271 (2013.01)

(58) Field of Classification Search
CPC ......... H04N 7/364; H04N 7/50; H04N 7/462; H04N 7/26244; H04N 7/26271
See application file for complete search history.

(56) References Cited

U.S. PATENT DOCUMENTS 4,890,160 A 12/1989 Thomas
4,905,081 A 2/1990 Morton
(Continued)

FOREIGN PATENT DOCUMENTS

EP 0659021 A2 6/1995
EP 2207139 A1 7/2010

OTHER PUBLICATIONS

Argyriou et al., "A Study of sub-pixel Motion Estimation Using Phase Correlation", Centre for Vision, Speech and Signal Processing University of Survey, pp. 1-10.
(Continued)

Primary Examiner — Shawn An
(74) Attorney, Agent, or Firm — Haverstock & Owens LLP

(57) ABSTRACT

A method of improving accuracy and reliability of motion estimation is described herein. In one aspect, a 2D neighborhood of phase correlation peak is approximated with an outer-product of two 1D vectors to eliminate the sub-pixel error. In another aspect, estimation of reliability is improved. In yet another aspect, two-pass phase correlation is implemented to eliminate sub-pel motion bias.

6 Claims, 9 Drawing Sheets

(51) Int. Cl.
*H04N 19/547* (2014.01)
*H04N 19/513* (2014.01)
*H04N 19/172* (2014.01)

(56) References Cited

U.S. PATENT DOCUMENTS

| | | | |
|---|---|---|---|
| 5,005,078 | A | 4/1991 | Gillard |
| 5,682,205 | A | 10/1997 | Sezan et al. |
| 5,940,145 | A | 8/1999 | Burl |
| 6,057,892 | A | 5/2000 | Borer |
| 6,075,818 | A | 6/2000 | Thomson |
| 6,611,560 | B1 | 8/2003 | Kresch et al. |
| 7,349,583 | B2 | 3/2008 | Kumar et al. |
| 7,620,269 | B1 | 11/2009 | Nandy |
| 7,751,482 | B1 * | 7/2010 | Srinivasan ........... H04N 19/547 375/240.12 |
| 7,751,591 | B2 | 7/2010 | Bober et al. |
| 7,809,208 | B2 | 10/2010 | Kang |
| 7,831,065 | B2 | 11/2010 | Zimmermann et al. |
| 8,155,452 | B2 | 4/2012 | Minear |
| 8,233,730 | B1 | 7/2012 | Namboodiri et al. |
| 8,285,079 | B2 | 10/2012 | Robertson et al. |
| 8,311,116 | B2 | 11/2012 | Namboodiri et al. |
| 2002/0097342 | A1 | 7/2002 | Hu |
| 2009/0304266 | A1 | 12/2009 | Aoki et al. |
| 2011/0176013 | A1 | 7/2011 | Robertson et al. |
| 2011/0229056 | A1 * | 9/2011 | Robertson ............... G06T 7/204 382/294 |

OTHER PUBLICATIONS

G.A. Thomas et al., "Television Motion Measurement for Datv and Other Applications", (PH-283), XP000611063, pp. 1-20.

Takita et al., "High-Accuracy Subpixel Image Registration Based on Phase-only Correlation." Aug. 2003, IEICE Trans. Fundamentals, vol. E86-A, No. 8.

Turin, George., 'An Introduction to Matched Filters', IRE Transactions of Information Theory, pp. 311-329, Jan. 23, 1960, Hughes Research Laboratories, Malibu, CA.

Vera et al., "Subpixel Accuracy Analysis of Phase Correlation Registration methods Applied to Aliased Imagery", 16th European Signal Processing Conference, Aug. 25-29, 2008, pp. 1-6.

Yan et al., "Robust Phase Correlation based Motion Estimation and Its Applications", Department of Earth Science and Its Applications, pp. 1-10.

Yeping Su, "Robust Global Motion Estimation from Coarsely Sampled Motion Vector Fields", Department of Electrical Engineering, University of Washington, Box 352500, Seattle, W 98195, CCL/ITRI, Taiwan., http://spiedigitallibary.org/on Mar. 5, 2014 Terms of Use: http://spiedl.org/terms, Image and Video Communications and Processing 2003, SPIE vol. 5022, pp. 98-101.

* cited by examiner

| Neighborhood of Peak with Peak Boxed | Estimated Sub-Pel Motion $(dx_0, dy_0)$ | Filter $p_R[x,y; dx_0, dy_0]$ | Filter Peak Value $s_P[x,y; dx_0, dy_0]$ |
|---|---|---|---|
| 0.011925  -0.149837  -0.110260<br>-0.099234  0.427355  0.380870<br>-0.112747  0.313244  0.314103 | (0.48, 0.44) | 0.062954  -0.194405  -0.178677<br>-0.205988  0.636094  0.584633<br>-0.161938  0.500069  0.459613 | 0.88 |
| 0.081840  -0.289702  -0.014889<br>-0.094965  0.691094  0.166094<br>-0.047553  0.274667  0.088583 | (0.18, 0.29) | 0.032526  -0.209072  -0.047218<br>-0.145085  0.932581  0.210619<br>-0.058964  0.379008  0.085597 | 0.87 |
| 0.094430  -0.018906  0.048594<br>-0.089208  0.982746  0.027852<br>-0.047082  0.024654  -0.064915 | (0.02, 0.03) | 0.000628  -0.023938  -0.000663<br>-0.026232  0.999525  0.027685<br>-0.000660  0.025142  0.000696 | 0.99 |

Fig. 9

METHOD TO IMPROVE ACCURACY AND RELIABILITY OF MOTION ESTIMATED WITH PHASE CORRELATION

RELATED APPLICATIONS

This application is a divisional of co-pending of U.S. patent application Ser. No. 12/912,587, filed on Oct. 26, 2010, titled, "METHOD TO IMPROVE ACCURACY AND RELIABILITY OF MOTION ESTIMATED WITH PHASE CORRELATION" which is hereby incorporated by reference in its entirety for all purposes.

FIELD OF THE INVENTION

The present invention relates to the field of image and video processing. More specifically, the present invention relates to performing phase correlation motion estimation.

BACKGROUND OF THE INVENTION

The process of performing motion estimation is able to be implemented in a number of ways. One implementation includes utilizing phase correlation. Phase correlation uses a frequency-domain approach to estimate the relative translative offset between two similar images.

There are a number of conventional methods to determine sub-pel precision from the phase correlation surface. These sub-pel methods can generally be categorized as 1-D methods or 2-D methods. A 1-D method operates on each spatial dimension independently. In other words, the vertical and horizontal sub-pel components of motion are determined separately.

FIG. 1 illustrates notation that is used by the different sub-pel methods. The entries $a_{ij}$ are simply the values of s[x,y] (the phase correlation surface) in the neighborhood of the location of the peak in the phase correlation surface. The peak value is $a_{22}$, and $a_{ij}=s[x_k+j-2,y_k+i-2]$, where $(x_k,y_k)$ is the location of the peak. Note that due to properties of the FFT, evaluation of indices to the phase correlation surface s[x,y] is performed modulo N. The 2D sub-pel methods are able to use some or all of the correlation values in the figure. Some 2D methods use even larger windows, which are able to make use of correlation values that extend beyond the 3×3 neighborhood demonstrated.

The 1-D sub-pel methods consider horizontal and vertical sub-pel components independently, and use the correlation values shown in FIG. 2.

It is shown by H. Foroosh et al. in "Extension of Phase Correlation to Subpixel Registration" that the phase correlation surface in the presence of translational motion is very well approximated by a sinc function. Derivations in Foroosh et al. lead to a relatively simple 1-D sub-pel method that operates in each spatial direction independently. The method is applied to the neighborhood near the phase correlation peak.

In "Television Motion Measurement for DATV and Other Applications" by G. A. Thomas, a 1-D quadratic function is fit to the three points in the neighborhood of the phase correlation peak (either the horizontal or vertical values shown in FIG. 2). In "Practical Approach to the Registration of Multiple Frames of Video Images" by I. E. Abdou, a 1-D Gaussian function is fit in a similar fashion. Results for the methods of Thomas and Abdou are marginal, because as shown in Foroosh et al., the phase correlation surface is neither quadratic nor Gaussian, and as such the methods are limited because of inappropriate fitting functions. Also, in many cases the 1-D sub-pel methods do not provide as complete of a fit in the peak neighborhood as is possible when using the 2-D sub-pel methods.

In "A Study of Sub-Pixel Motion Estimation Using Phase Correlation" by V. Argyriou et al., the following modified sinc function is considered:

$$h(x) = \exp(-x^2)\frac{\sin(\pi x)}{\pi x}.$$

It is then determined the three parameters A, B, and C that best fit the function A·h(B[x−C]) to the observed phase correlation surface, in a least squares sense. Determining such a fit is complicated, since there is no closed-form solution. It thus requires numerical solution, which can be computationally demanding. Note that this method is also a 1-D sub-pel method, so that it shares the limitation mentioned previously for 1-D sub-pel methods compared to 2-D sub-pel methods.

In "High-Accuracy Subpixel Image Registration Based on Phase-Only Correlation" by Takita et al., it is proposed to fit a 2-D Gaussian function to the phase correlation surface. First, a frequency-domain Gaussian pre-filter (applied to S[m,n], the phase correlation surface in the Fourier domain) is used to smooth the phase correlation surface. Second, least squares is used to fit the 7×7 neighborhood of the correlation peak to a Gaussian function. The large window size combined with a least-squares optimization for the complicated Gaussian function can lead to an overly complex algorithm.

Finally, in "Robust Motion Estimation for Video Sequences Based on Phase-Only Correlation" by L. H. Chien et al., it is proposed to fit the following 2-D function to the phase correlation surface near the correlation peak:

$$h(x,y) = \frac{\alpha}{N^2} \frac{\sin[\pi(x+\Delta x)]\sin[\pi(y+\Delta y)]}{\sin\left[\frac{\pi}{N}(x+\Delta x)\right]\sin\left[\frac{\pi}{N}(y+\Delta y)\right]}$$

An unspecified frequency-domain pre-filter is used to smooth the phase correlation surface. An unspecified size for the fitting window is also used, although it appears from a figure that the window size may be 7×7. The complicated nature of the equation h(x,y) leads to a computationally demanding least-squares solution for the Δx and Δy, and for α which must be estimated as part of the solution.

The methods described all perform sub-pixel estimation based on the neighborhood of the phase correlation peak, which uses the s[x,y] values introduced previously. Alternative configurations exist that work in the Fourier domain directly on the S[m,n] values. One such method is that of "*Subspace Identification Extension to the Phase Correlation Method*" by Hoge. In Hoge, a singular value decomposition of the N×N array S[m,n] to form a rank-1 approximation of the phase surface S[m,n] is performed. The resulting length-N vectors from the rank-1 approximation are then processed separately to give the horizontal and vertical motion. This method avoids the need for the IFFT and peak finding but requires other complicated procedures in their place: singular value decomposition, phase unwrapping and least-squares line fitting.

SUMMARY OF THE INVENTION

A method of improving accuracy and reliability of motion estimation is described herein. In one aspect, a 2D neighborhood of phase correlation peak is approximated with an outer-product of two 1D vectors to eliminate the sub-pixel error. In another aspect, estimation of reliability is improved. In yet another aspect, two-pass phase correlation is implemented to eliminate sub-pel motion bias.

In one aspect, a method of performing phase correlation to eliminate sub-pixel motion bias programmed in a memory in a device comprises performing a first pass of phase correlation, offsetting a window in a reference picture using an offset according to motion determined in the first pass, performing a second pass of the phase correlation using an original current window and the offset reference window to generate a second phase correlation surface, computing sub-pixel motion estimates based on the second phase correlation surface and computing a final motion estimate by summing the offset and sub-pixel estimates. Performing a first pass of phase correlation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. Performing a second pass of phase correlation further comprises applying an offset window function to the window of a reference frame to obtain an offset frame result, applying a Fast Fourier Transform to the offset frame result yielding a third set of complex values, normalizing a product of the third set of complex values and a complex conjugate of the first set of complex values and computing an inverse Fast Fourier Transform to yield a second phase correlation surface. The method further comprises implementing a reliability measure. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a Blu-ray® writer/player, a television and a home entertainment system.

In another aspect, a system for performing phase correlation to eliminate sub-pixel motion bias programmed in a memory in a device comprises a first pass module for performing a first pass of phase correlation, an offset module for offsetting a window in a reference picture using an offset according to motion determined in the first pass, a second pass module for performing a second pass of the phase correlation using an original current window and the offset reference window to generate a second phase correlation surface, a sub-pixel module for computing sub-pixel motion estimates based on the second phase correlation surface and a final motion module for computing a final motion estimate by summing the offset and sub-pixel estimates. The first pass module further comprises a first window function module for applying a window function to a window of a current frame to obtain a current frame result, a first Fast Fourier Transform module for applying a Fast Fourier Transform to the current frame result yielding a first set of complex values, a second window function module for applying the window function to the window of a reference frame to obtain a reference frame result, a second Fast Fourier Transform module for applying the Fast Fourier Transform to the reference frame result yielding a second set of complex values, a normalizing module for normalizing a product of the second set of complex values and a complex conjugate of the first set of complex values, an inverse Fast Fourier Transform module for computing an inverse Fast Fourier Transform to yield a phase correlation surface and a peak identification module for identifying one or more peaks from the phase correlation surface, wherein indices of the peaks correspond to possible motions. The second pass module further comprises an offset window function module for applying an offset window function to the window of a reference frame to obtain an offset frame result, a third Fast Fourier Transform module for applying the Fast Fourier Transform to the offset frame result yielding a third set of complex values, normalizing a product of the third set of complex values and a complex conjugate of the first set of complex values and a second inverse Fast Fourier Transform module for computing the inverse Fast Fourier Transform to yield a second phase correlation surface. The system further comprises a reliability module for implementing a reliability measure. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In another aspect, a camera device comprises a video acquisition component for acquiring a video, an encoder for encoding the video, including phase correlation motion estimation, by performing a first pass of phase correlation, offsetting a window in a reference picture using an offset according to motion determined in the first pass, performing a second pass of the phase correlation using an original current window and the offset reference window to generate a second phase correlation surface, computing sub-pixel motion estimates based on the second phase correlation surface and computing a final motion estimate by summing the offset and sub-pixel estimates and a memory for storing the encoded video. Performing the first pass of phase correlation further comprises applying a window function to a window of a current frame to obtain a current frame result, applying a Fast Fourier Transform to the current frame result yielding a first set of complex values, applying the window function to the window of a reference frame to obtain a reference frame result, applying the Fast Fourier Transform to the reference frame result yielding a second set of complex values, normalizing a product of the second set of complex values and a complex conjugate of the first set of complex values, computing an inverse Fast Fourier Transform to yield a phase correlation surface and identifying one or more peaks from the phase correlation surface, wherein indices of the peaks correspond to possible motions. Performing the second pass of phase correlation further comprises applying an offset window function to the window of a reference frame to obtain an offset frame result, applying a Fast Fourier Transform to the offset frame result yielding a third set of complex values, normalizing a product of the third set of complex values and a complex conjugate of the first set of complex values and computing an inverse Fast Fourier Transform to yield a second phase correlation surface.

In another aspect, a method of determining sub-pixel motion estimation accuracy with phase correlation programmed in a memory in a device comprises approximating a two-dimensional neighborhood of a phase correlation peak with an outer-product of two one-dimensional vectors and automatically correcting an incorrect estimated peak location. The two-dimensional neighborhood is selected from the group consisting of a 3×3 neighborhood, 4×4 neighborhood and 5×5 neighborhood. The two one-dimensional vectors include a column vector corresponding to a vertical sub-pixel motion vector and a row vector corresponding to a horizontal sub-pixel motion vector. Approximating the two-dimensional neighborhood includes implementing a rank-1 matrix approximation.

In another aspect, a method of improving estimation of reliability of motion estimation programmed in a memory in a device comprises performing motion estimation to estimate an integer component of motion for a best peak and a sub-pixel component, applying a filter to measure how a peak neighborhood matches an expected shape of a phase correlation peak and computing the reliability of the motion estimation. Computing the reliability utilizes a second-best peak. The filter utilizes a normalizing factor. The filter is truncated to one of a 3×3 window, a 4×4 window or a 5×5 window.

In another aspect, a method of computing a reliability measure programmed in a memory in a device comprises performing motion estimation to estimate an integer component of motion for a best peak and a sub-pixel component of the best peak, applying a filter to a phase correlation surface in a neighborhood of the best peak and computing the reliability measure utilizing the resulting filtered surface. The filter implements a normalization constant. The computing of the reliability uses a position of a second-best peak. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

In yet another aspect, a method of improving sub-pel accuracy of motion vectors programmed in a memory in a device comprises determining a two-dimensional neighborhood of a phase correlation peak to be approximated and approximating the two-dimensional neighborhood of the phase correlation peak with an outer-product of two one-dimensional vectors. The two-dimensional neighborhood is selected from the group consisting of a 3×3 neighborhood, 4×4 neighborhood and 5×5 neighborhood. The two one-dimensional vectors include a column vector corresponding to a vertical sub-pixel motion vector and a row vector corresponding to a horizontal sub-pixel motion vector. The device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

BRIEF DESCRIPTION OF THE DRAWINGS

FIG. 9 illustrates examples of filters for determining reliability.

DETAILED DESCRIPTION OF THE PREFERRED EMBODIMENT

Pixels are organized into blocks, which are the basic unit of analysis within an image. Motion estimation is a way of describing the difference between two images in terms of where each block of the former image has moved. Each block in a current image is associated with an area in a reference image, that is well-correlated, using a "motion vector." The motion vectors may relate to the whole image, referred to as global motion estimation, or specific parts, such as rectangular blocks, arbitrary shaped patches or even per pixel. There are many applications of motion estimation, such as estimating motion between the images of FIG. 3.

Figure 1:
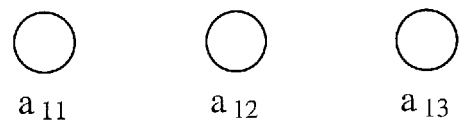
FIG. 1 illustrates a notation that is used by the different sub-pel methods.
Figure 1:
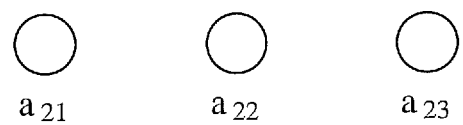
Figure 1:
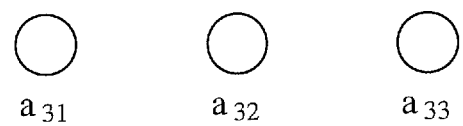
Figure 2:
FIG. 2 illustrates a notation that is used by the different sub-pel methods.
Figure 2:
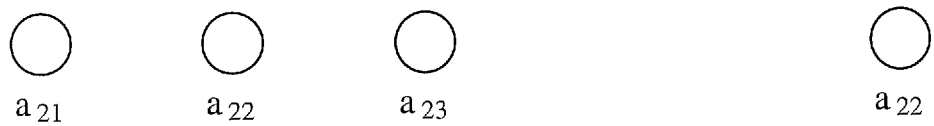
Figure 3:
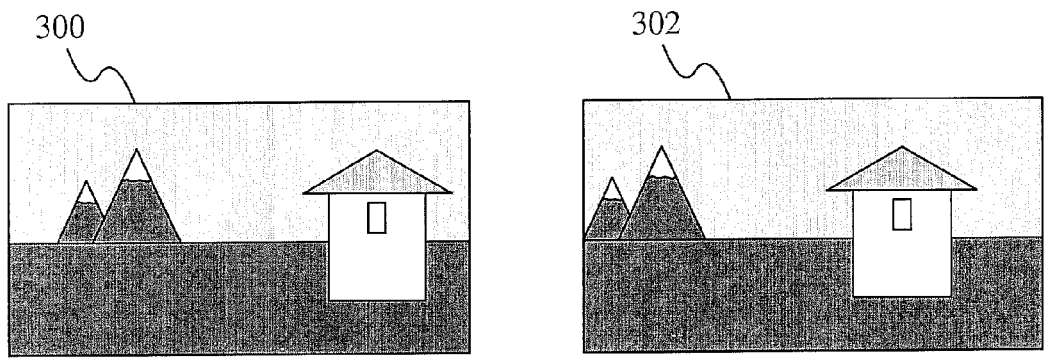
FIG. 3 illustrates motion estimation between two images captured by a camera.

FIG. 3 illustrates two images whose motion is able to be estimated. Image 302 is the same scene as image 300, but the camera has panned to the right in the image 302. If the images are aligned by estimating the motion between them, there are numerous possible applications. One such application is to stitch them together as part of a panoramic image, which is able to be further extended spatially by continuing the process with more images as the camera pans further right. Another application is to reduce noise by averaging together pixel observations that correspond to the same location in both images. Motion estimation is also commonly used to form motion-compensated predictions as part of video compression. There are many other applications as well.

Figure 4:
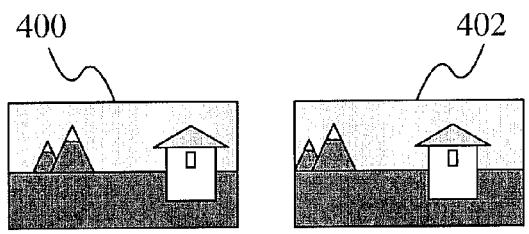
FIG. 4 illustrates images from FIG. 3 at a reduced resolution.

One disadvantage of estimating motion between full-resolution images is that the quantity of pixels to be processed can be prohibitively complex. For this reason, in some instances, it is desirable to reduce the size, and therefore the resolution, of the images 300 and 302 to the images 400 and 402, prior to estimating their motion, such as shown in FIG. 4. Processing fewer pixels leads to a more manageable computational load.

Using smaller images reduces the computational load, but accuracy of the motion estimation (ME) method becomes much more important. For example, suppose that the images are down sampled by a factor of eight in each dimension. If the accuracy of ME is ½-pixel (measured at the resolution at which processing occurs), then processing at the reduced resolution yields accuracy of just ½×8=4 pixels when returned to full resolution. Such accuracy may be unacceptable. Thus, although an ME algorithm with ½-pixel accuracy may provide satisfactory alignment results when applied at full resolution, the same algorithm applied to reduced-resolution images may not be accurate enough. To achieve ½-pixel accuracy measured at full resolution, an ME estimation algorithm must have 1/16-pixel accuracy when applied to images down sampled by eight.

Figure 5:
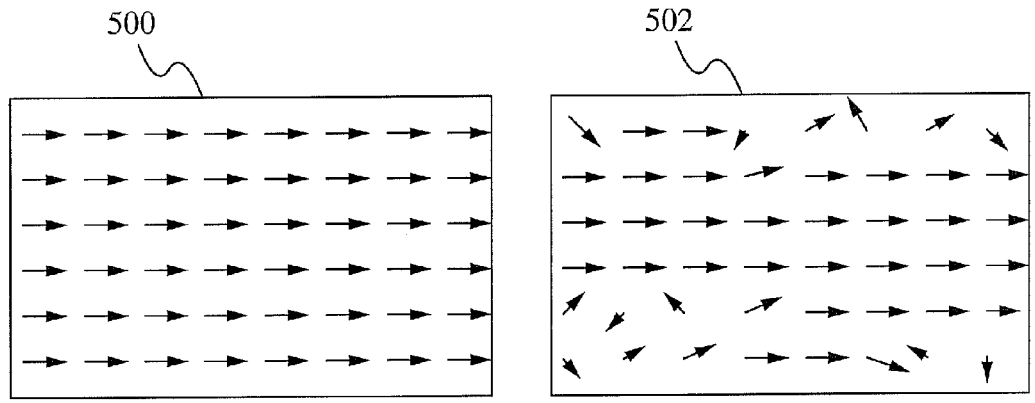
FIG. 5 illustrates an ideal motion field and a noisy motion field relating the two images of FIG. 3.

The motion vectors are able to be measured as localized motion vectors, each motion vector associated with matching blocks between the two images. A motion field is a compilation of all localized motion vectors between the two images. For the two example images, the image 300 and the image 302, shown in FIG. 3, there are no independently moving objects in the scene. As such, the ideal motion field relating the image 302 to the image 300 should be a uniform motion field. FIG. 5 illustrates an ideal motion field 500 relating the image 302 to the image 300 of FIG. 3. Each arrow represents the motion vector of a corresponding block in the two images. Each arrow is facing right, which corresponds to the camera panning right between capturing the image 300 and then capturing the image 302. However, in practice, the measured motion field is not ideal. FIG. 5 illustrates an exemplary measured motion field 502 relating the image 302 to the image 300. Incorrect motion vectors (MV) such as those shown in vector field 502 are able to occur due to a variety of reasons, such as image noise or insufficient image detail. In general, the motion field 502 of FIG. 5 is observed and measured, but it is desired to estimate the ideal global motion as it appears in the motion field 500. When errors are common and large as those shown in 502, a satisfactory solution requires some sort of robust model-fitting. The model should be robust in the sense that data points with big error, referred to as "outliers", do not adversely affect the output. Most robust model-fitting methods either explicitly or implicitly try to identify the outliers, and compute a final output based only on the reliable data. Identifying outliers as part of the model-fitting process is often computationally demanding, usually requiring some sort of iterative procedure.

Explicit estimation of motion vector reliability which is able to identify outliers is described herein. The motion vector reliability is estimated by very efficient means. By identifying the outliers of motion vectors prior to performing model fitting, the model-fitting procedure becomes both more accurate and more computationally efficient.

A method to determine sub-pel motion estimation to high accuracy with phase correlation is described herein. The method approximates the 2D neighborhood of the phase correlation peak with an outer-product of two 1D vectors. The theoretically justified approximation simplifies the problem from two dimensions to one dimension, making the problem of sub-pixel estimation more tractable.

The outer-product approximation reduces the effects of noise in the neighborhood of the phase correlation peak.

If the estimated peak location is wrong by one pixel (which happens frequently for motions near ½-pel horizontal and ½-pel vertical motion, due to noise in the PC surface), standard 1D sub-pel methods often yield high sub-pel error. The 2D-to-1D simplification automatically corrects for such situations.

In U.S. patent application Ser. No. 12/728,025, filed Mar. 19, 2010, and entitled, "Method for Highly Accurate Estimation of Motion Using Phase Correlation," which is incorporated by reference herein, a motion reliability measure was introduced. Given phase correlation motion vectors, the measure provides an estimate of their reliability, or the degree to which the validity of the values should be trusted. This is important when combining many different motions from application of phase correlation to different locations of an image pair, because unreliable motions are able to be identified and prevented from corrupting any overall estimation. Identifying such unreliable motions is also able to reduce computational complexity because a robust model-fitting algorithm will not have to work as hard to identify outlier motions on its own. Building on the previous method, a new method that is much more effective when the motion is sub-pixel in nature is provided.

In U.S. patent application Ser. No. 12/728,025, filed Mar. 19, 2010, and entitled, "Method for Highly Accurate Estimation of Motion Using Phase Correlation," the concept of sub-pixel bias in phase correlation was introduced. Such bias is a small non-zero-mean error that is able to corrupt phase correlation sub-pixel motion when the block size is relatively small. The previous submission discussed one method to compensate for the bias. A new method is introduced that is much more effective at removing bias. The method performs part of the general phase correlation algorithm in a first pass, and then additional parts of the general phase correlation algorithm in a second pass. Bias is virtually non-existent as a result.

Phase correlation is able to be applied to an entire image or to sub-blocks within an image. Although application to image sub-blocks is described herein, application to the whole image is accomplished by letting the block size and window size cover the entire image.

Figure 6:
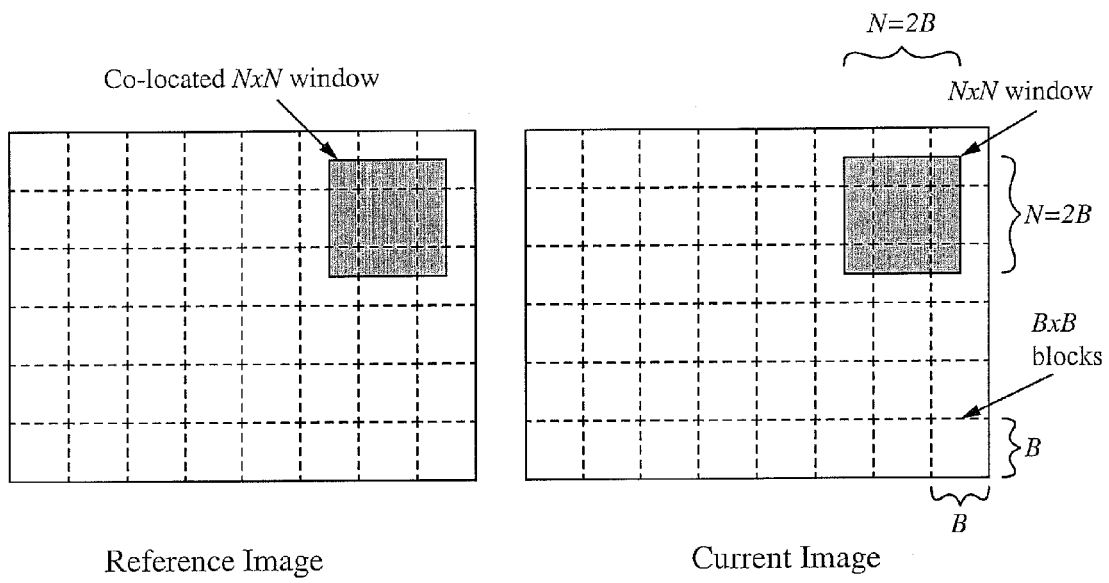
FIG. 6 illustrates an example of applying phase correlation to local blocks of an image pair.

Local motion analysis is performed on each B×B block in an image. Phase correlation estimates motion by considering a window that surrounds the B×B target block. A surrounding window size of N×N where N=2B is used, but in general other window sizes and shapes are able to be used. Phase correlation considers an N×N window in both the current image and the reference image, where the windows are able to be co-located or, in the more general case, an offset is able to be present for the block in the reference frame due to a motion predictor. FIG. 6 illustrates an example of co-located blocks.

Figure 7:
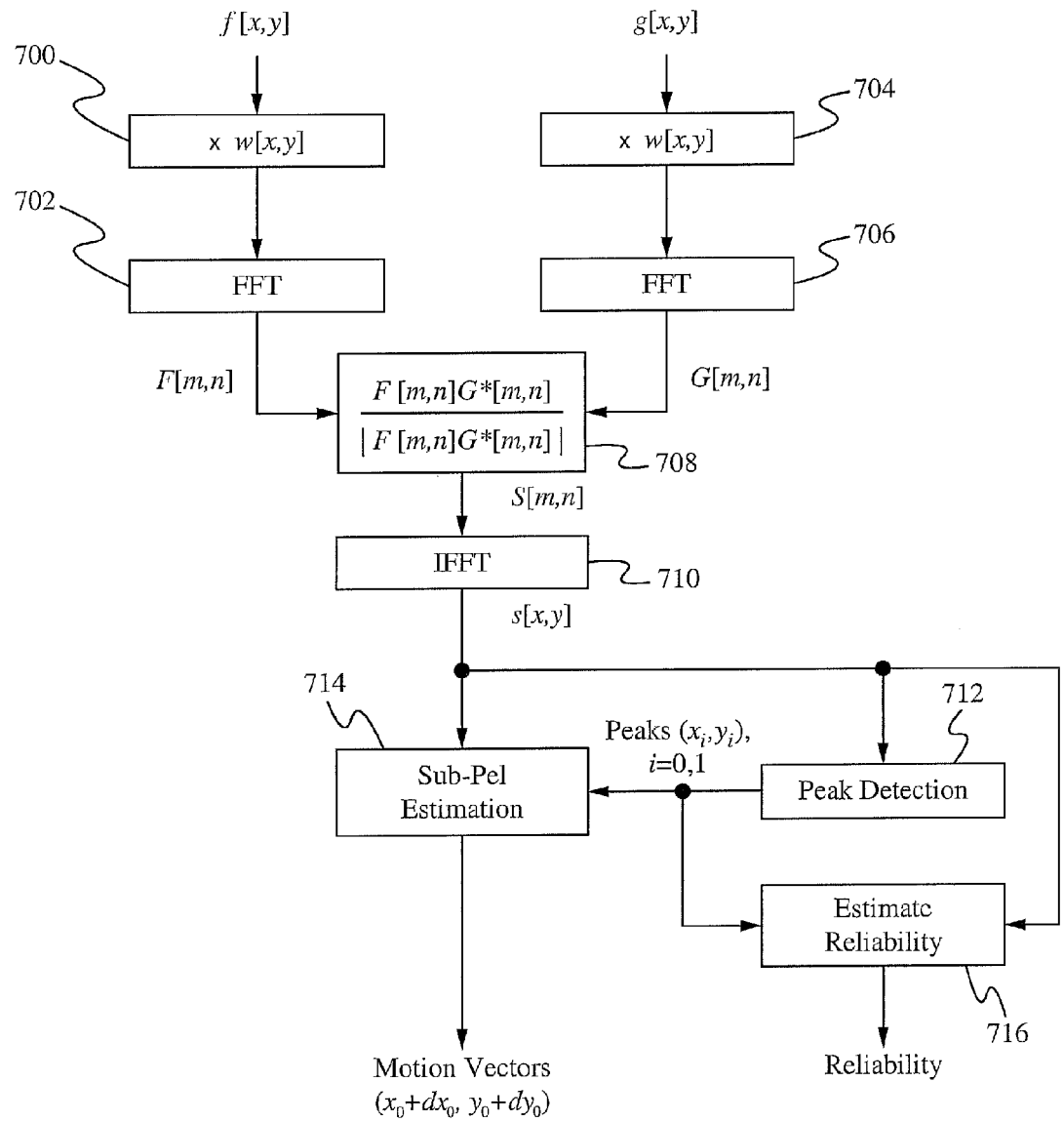
FIG. 7 illustrates a flowchart of phase correlation according to some embodiments.

FIG. 7 illustrates a flowchart of phase correlation according to some embodiments. In the step 700, point-wise multiplication of the N×N window in the reference frame with window function w[x,y] is performed. In the step 702, a Fast Fourier Transform (FFT) is applied to the result, which yields the complex values F[m,n]. In the step 704, point-wise multiplication of the N×N window in the current frame is performed with the window function w[x,y]. In the step 706, a FFT is applied to the result, which yields the complex values G[m,n]. In the step 708, in the normalization stage, the following equation is computed:

$$S[m,n] = \frac{F[m,n]G^*[m,n]}{|F[m,n]G^*[m,n]|},$$

where * denotes the complex conjugate, and | | represents the magnitude of the complex argument. In the step 710, the inverse FFT (IFFT) of S[m,n] is computed to yield s[x,y], the phase correlation surface. In the step 712, the K biggest peaks are identified from the phase correlation surface. The indices of these peaks correspond to possible motions that are present between the N×N windows in the current and reference frames. The indices of these peaks are denoted as $(x_i, y_i)$, i=0, ..., K−1. The indices are positive integers in 0, 1, ..., N−1. A negative motion of −q leads to a peak at index position N−q. In the step 714, if sub-pixel precision is used, sub-pixel estimates $(dx_i, dy_i)$ are computed for the peaks $(x_i, y_i)$ previously identified. In the step 716, reliability is estimated.

For the window function, a 2-D separable extension of the Hamming window is used, w[x,y]=w[x]w[y], $$w[x] = \begin{cases} 0.53836 - 0.46164 \cos\left(\frac{2\pi x}{N-1}\right) & x = 0, 1, \ldots, N-1 \\ 0, & \text{else} \end{cases}.$$

Other implementations are able to be used as well, such as a Hann window, a Blackman window, a Bartlett window or any other window.

The peaks in the correlation surface represent possible motions. Larger peaks indicate higher correlation, and the largest peak often indicates the dominant motion in the N×N window.

In U.S. patent application Ser. No. 12/728,025, filed Mar. 19, 2010, and entitled, "Method for Highly Accurate Estimation of Motion Using Phase Correlation," it was shown that the following quantity is a good estimate of the reliability of the motion candidate $(x_0, y_0)$ with the highest phase correlation:

$$\text{reliability} = 1 - \frac{s[x_1, y_1]}{s[x_0, y_0]}. \tag{1}$$

This measure of reliability compares the size of the biggest peak $(x_0, y_0)$ with the second-biggest peak $(x_1, y_1)$.

Equation (1) is equivalent to the normalized difference between the top two peaks, $$\text{reliability} = \frac{s[x_0, y_0] - s[x_1, y_1]}{s[x_0, y_0]}.$$

FIG. 7 shows a block diagram for a basic implementation of phase correlation as described herein. The reliability measure is not usually part of traditional phase correlation. It is included in FIG. 7 to demonstrate the base phase correlation used.

Outer-Product Approximation

Consider the 3×3 neighborhood of peak $(x_k, y_k)$ in the phase correlation surface, represented here in matrix notation:

$$A = \begin{bmatrix} a_{11} & a_{12} & a_{13} \\ a_{21} & a_{22} & a_{23} \\ a_{31} & a_{32} & a_{33} \end{bmatrix}.$$

Although a 3×3 neighborhood is considered, other neighborhood sizes such as 4×4 and 5×5 are able to be used without changing the basic structure of the method.

According to basic derivations in phase correlation theory, the correlation surface in the presence of underlying image motion is a separable function, in other words $s[x,y] \approx s[x]s[y]$. This suggests a method to simplify the neighborhood A as follows:

$$A = \begin{bmatrix} a_{11} & a_{12} & a_{13} \\ a_{21} & a_{22} & a_{23} \\ a_{31} & a_{32} & a_{33} \end{bmatrix} \approx vu^t = \begin{bmatrix} v_1 \\ v_2 \\ v_3 \end{bmatrix} \begin{bmatrix} u_1 & u_2 & u_3 \end{bmatrix} = \begin{bmatrix} v_1 u_1 & v_1 u_2 & v_1 u_3 \\ v_2 u_1 & v_2 u_2 & v_2 u_3 \\ v_3 u_1 & v_3 u_2 & v_3 u_3 \end{bmatrix}.$$

The above equation approximates the 2D neighborhood A as an outer-product of two 1D vectors v and u. Given such an approximation, the previously established 1D sub-pel methods are able to be used to estimate the vertical sub-pel motion using v and the horizontal sub-pel motion using u.

A matrix approximation such as that above is also referred to as a rank-1 matrix approximation. One method to compute such an approximation is through the use of Singular Value Decomposition (SVD). However, SVD is computationally complicated, and it provides additional results that are unnecessary for the task at hand A much simpler method to form the rank-1 approximation is provided. The method is iterative, beginning with iteration k=1 and continuing until iteration k=L. The superscript$^{(k)}$ notation indicates values for iteration k.

$$v^{(k)} = \frac{Au^{(k-1)}}{|Au^{(k-1)}|}. \tag{2}$$

$$u^{(k)} = A^t v^{(k)}$$

The normalization of $v^{(k)}$ in Equation (2) imposes unit magnitude on the solution for $v^{(k)}$. Other techniques that form the matrix approximation are able to vary the method of scaling. For example, when SVD is used to form the rank-1 approximation, both $v^{(k)}$ and $u^{(k)}$ are normalized to unity magnitude, and a separate singular value indicates the scale. A different example algorithm that does not impose any unit-magnitude constraint is given by the following:

$$v^{(k)} = \frac{Au^{(k-1)}}{|u^{(k-1)}|^2}$$

$$u^{(k)} = \frac{A^t v^{(k)}}{|v^{(k)}|^2}.$$

Thus, there are multiple methods of forming the rank-1 approximation of the phase correlation peak's neighborhood, but in general, they will have an iterative alternating structure of estimating $v^{(k)}$ and $u^{(k)}$ as shown in Equation (2).

The initial condition $u^{(0)}$ is not very important, as long as $u^{(0)} \neq 0$. For example, in some embodiments, $u^{(0)}=1$. The simple matrix-vector operations above converge quickly to the desired approximation. In practice, the convergence is observed within 2 to 4 iterations.

Using the above procedure to simplify the 2D problem into separate 1D problems has multiple benefits. One-dimensional sub-pel estimation is inherently simpler to implement than corresponding two-dimensional sub-pel estimation. However, because the algorithm makes use of the entire 2D neighborhood, as opposed to the vertical and horizontal neighbors of the peak, there is not a loss in precision compared to other 2D methods.

Given the vectors v and u, it is possible to estimate the sub-pixel motion using any 1D phase correlation sub-pixel method, for example, those cited previously. A simple linear weighting method is shown here. The sub-pixel motion relative to the peak position $(x_k, y_k)$ is $$dy_k = \begin{cases} \dfrac{v_3}{v_2 + v_3}, & v_3 > v_1 \\ -\dfrac{v_1}{v_2 + v_1}, & \text{else} \end{cases} \quad (3)$$

$$dx_k = \begin{cases} \dfrac{u_3}{u_2 + u_3}, & u_3 > u_1 \\ -\dfrac{u_1}{u_2 + u_1}, & \text{else} \end{cases}$$

Under special circumstances (for example, $v_3<0$ and $v_1<0$), it is prudent to just choose that sub-pel motion component to be zero.

Another benefit of the rank-1 approximation relative to 1D sub-pel methods is that some mistakes in peak detection are able to be corrected. For example, the neighborhood below shows one real example of a phase correlation peak neighborhood, which is for a sub-pel motion of $dx=-0.5$, $dy=0.5$, which is half way along the diagonal between positions whose values are 0.444 and 0.407. The detected peak is at the center of the neighborhood, with value 0.444, and most of the peak energy is contained in the bottom-left 2×2 portion.

$$A = \begin{bmatrix} -0.077 & -0.019 & -0.079 \\ 0.375 & 0.444 & -0.032 \\ 0.407 & 0.150 & -0.070 \end{bmatrix}$$

Standard 1D sub-pel methods only use the middle row [0.375, 0.444, −0.032] and the center column [−0.019, 0.444, 0.150]$^t$ to compute the sub-pel estimate. Directly using the 1D sub-pel such as this gives a sub-pel estimate of $dx=-0.49$, $dy=0.25$, whose error is 0.25. However, this neglects a high-value diagonal element, 0.407, which contributes to the large sub-pixel error. Using the procedure described herein instead results in the following approximation:

$$A \approx \begin{bmatrix} -0.091 \\ 0.806 \\ 0.584 \end{bmatrix} [0.547 \quad 0.447 \quad -0.059] = \begin{bmatrix} -0.050 & -0.041 & 0.005 \\ 0.441 & 0.361 & -0.048 \\ 0.320 & 0.261 & -0.035 \end{bmatrix}$$

This approximation shows that a better peak position would have been the left position (with approximated value 0.441); due to noise in the phase correlation surface, the wrong peak position was originally found. However, the approximation shows the error, and automatically corrects for it as part of the algorithm. Using the same 1D sub-pel method on the vectors from the rank-1 approximation gives a sub-pel estimate of $dx=-0.55$, $dy=0.42$, whose error of 0.09 is considerably less than the error of the 1D method applied directly to the middle row and center column of A, whose error was 0.25.

The ability of the rank-1 approximation to both lower error and correct small errors in peak finding is due to its noise-reducing properties. Prior knowledge about the structure of A has allowed A to be represented with fewer degrees of freedom than the nine values that originally comprise A. In other contexts, the noise-reducing properties of reduced-rank approximations with SVD are known.

To prove the iterations in Equation (2) converge to the best rank-1 approximation to the matrix A, a result from SVD theory is stated. The 3×3 matrix A is able to be decomposed as follows:

$$A = \sigma_1 v_1 u_1^t + \sigma_2 v_2 u_2^t + \sigma_3 v_3 u_3^t$$

where the following are true:

$$v_j^t v_i = \begin{cases} 0, & i \neq j \\ 1, & i = j \end{cases}$$

$$u_j^t u_i = \begin{cases} 0, & i \neq j \\ 1, & i = j \end{cases}$$

$$\sigma_i \geq \sigma_j, \, i < j$$

According to SVD theory, the best rank-1 approximation to the matrix A is $A \approx \sigma_1 v_1 u_1^t$. To prove that the iterations of Equation (2) converge to such a quantity; it suffices to show that:

$$\lim_{n \to \infty} v^{(n)} \stackrel{?}{=} v_1$$

$$\lim_{n \to \infty} u^{(n)} \stackrel{?}{=} \sigma_1 u_1.$$

At iteration $k=n$ of Equation (2), $$v^{(n)} = \frac{A(A^t A)^{n-1} u^{(0)}}{|A(A^t A)^{n-1} u^{(0)}|}.$$

$$u^{(n)} = A^t v^{(n)}$$

To simplify, begin with computing $A^t A$:

$$A^t A = [\sigma_1 u_1 v_1^t + \sigma_2 u_2 v_2^t + \sigma_3 u_3 v_3^t][\sigma_1 v_1 u_1^t + \sigma_2 v_2 u_2^t + \sigma_3 v_3 u_3^t] = [\sigma_1^2 u_1 u_1^t + \sigma_2^2 u_2 u_2^t + \sigma_3^2 u_3 u_3^t]$$

When raised to the power n, $$(A^t A)^n = [\sigma_1^{2n} u_1 u_1^t + \sigma_2^{2n} u_2 u_2^t + \sigma_3^{2n} u_3 u_3^t]$$

When pre-multiplied by the matrix A, $$A(A^t A)^n = [\sigma_1^{2n+1} v_1 u_1^t + \sigma_2^{2n+1} v_2 u_2^t + \sigma_3^{2n+1} v_3 u_3^t]$$

In the limit as iterations increase, the estimate for v is $$\lim_{n \to \infty} v^{(n)} = \lim_{n \to \infty} \frac{A(A^t A)^{n-1} u^{(0)}}{|A(A^t A)^{n-1} u^{(0)}|}$$

$$= \lim_{n \to \infty} \frac{[\sigma_1^{2n-1} v_1 u_1^t + \sigma_2^{2n-1} v_2 u_2^t + \sigma_3^{2n-1} v_3 u_3^t] u^{(0)}}{|[\sigma_1^{2n-1} v_1 u_1^t + \sigma_2^{2n-1} v_2 u_2^t + \sigma_3^{2n-1} v_3 u_3^t] u^{(0)}|}$$

$$= \lim_{n \to \infty} \frac{\left[ v_1 u_1^t + \dfrac{\sigma_2^{2n-1}}{\sigma_1^{2n-1}} v_2 u_2^t + \dfrac{\sigma_3^{2n-1}}{\sigma_1^{2n-1}} v_3 u_3^t \right] u^{(0)}}{\left| \left[ v_1 u_1^t + \dfrac{\sigma_2^{2n-1}}{\sigma_1^{2n-1}} v_2 u_2^t + \dfrac{\sigma_3^{2n-1}}{\sigma_1^{2n-1}} v_3 u_3^t \right] u^{(0)} \right|}$$

$$= \frac{v_1 u_1^t u^{(0)}}{|v_1 u_1^t u^{(0)}|}$$

$$= v_1$$

The simplification in the limit above assumes $\sigma_1 > \sigma_2 \geq \sigma_3$. In the unlikely event that $\sigma_1 = \sigma_2$ or $\sigma_1 = \sigma_3$, the limit will converge to some combination of $v_1$, $v_2$ and $v_3$ vectors. In this case, no unique rank-1 approximation exists. Such conditions would only occur in artificially contrived situations, and would be extremely rare when processing real data.

In the limit as iterations increase, the estimate for u is $$\lim_{n\to\infty} u^{(n)} = \lim_{n\to\infty} A^t u^{(n)}$$
$$= A^t v_1$$
$$= [\sigma_1 u_1 v_1^t + \sigma_2 u_2 v_2^t + \sigma_3 u_3 v_3^t] v_1$$
$$= \sigma_1 u_1$$

Thus, the iterations in Equation (2) indeed converge as desired.

Global Image Alignment

To determine the global motion between two images, a global camera model is able to be fitted to the individual motion vectors from the different blocks. As was shown in FIG. 5, sometimes many of the local motion vectors are outliers—completely inappropriate to use to determine the global motion. In this section, a method to assign a reliability measure to each of the motion vectors is described, which is able to make the overall job of robust model fitting more accurate and efficient.

In the literature, there are various heuristic methods to estimate reliability of a motion vector. Some simple methods are based on the assumption that smooth areas tend to give bad motion vector estimates. Such methods assign reliability based on spatial measures of the input image blocks, such as pixel variance, or edge activity, or presence of features such as corners. In the context of phase correlation, some methods use the amplitude of the phase correlation peak as a proxy for reliability. All these methods are limited because they require additional complexity, they work poorly in practice, or both. The method is based on comparing the best motion vector estimate with the second-best motion vector estimate.

The model-fitting procedure is not described in detail here because the reliability measure is applicable for many different variations of model-fitting algorithm. By way of example, one could use a projective eight-parameter model for the motion induced by camera motion. Such a model is a common technique to parameterize camera motion in image and video processing tasks. For fitting the motion vector data to the model, one is able to use any robust model-fitting technique.

Limitations of Previous Measure of Reliability

The original reliability measure was presented in Equation (1), which for convenience we repeat below:

$$\text{reliability} = 1 - \frac{s[x_1, y_1]}{s[x_0, y_0]}.$$

By definition $s[x_0,y_0] \geq s[x_1,y_1]$, so that $0 \leq \text{reliability} \leq 1$. This method assigns reliability based on how much bigger is the primary peak than the secondary peak. A binary decision is able to be made about the trustworthiness of the candidate motion vector by comparison of the reliability measure with an appropriate threshold. This measure is a very low cost estimate of motion vector reliability, which makes use of information already computed during the phase correlation procedure.

As long as the peak value $s[x_0,y_0]$ is a good approximation to the strength of the peak signal, the measure of Equation (1) is a very good indicator of motion vector quality. For integer-pel motion, it is well known that the phase correlation peak is approximately an impulse, with its energy concentrated at a single position. In such cases, the reliability measure above works very well. However, when the motion becomes sub-pixel, the peak in the phase correlation surface spreads out across multiple positions, which causes the amplitude of the peak to decrease. In such cases, the best peak value $s[x_0,y_0]$ in Equation (1) does not accurately reflect the energy in the peak signal, and thus the reliability measure does not accurately reflect the quality of the motion estimate.

Figure 8:
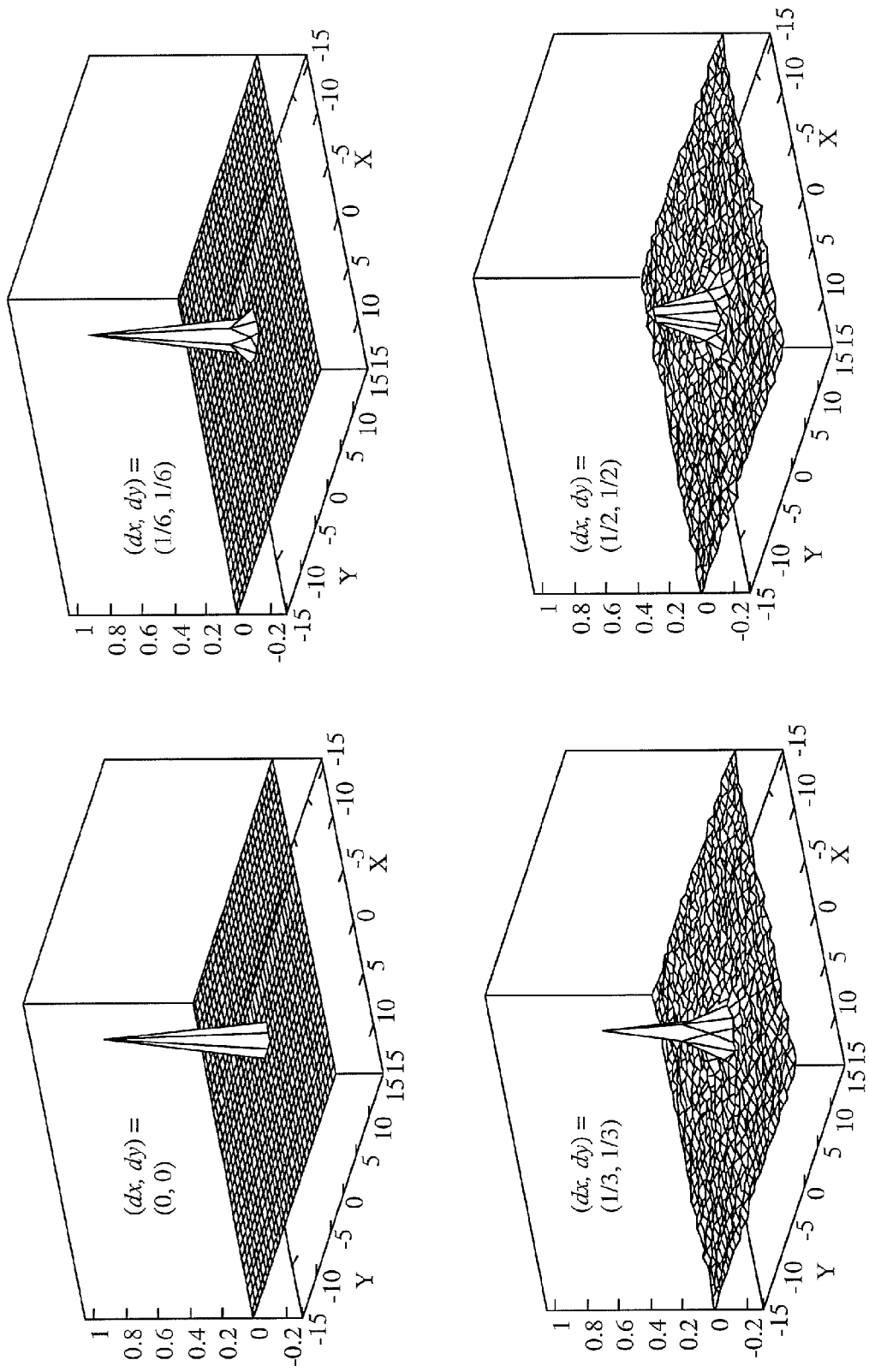
FIG. 8 illustrates examples of peaks in the phase correlation surface for different sub-pixel motions.

FIG. 8 shows four separate phase correlation surfaces for four different sub-pel motions. The integer motion at top-left results in a clean impulse at exactly one position. As the sub-pixel motion increases, the figures show the progressive decreasing and spreading of the peak. For motion of (½, ½), the amplitude has decreased to approximately 40% of the value for motion of (0,0). Such dramatic decrease might not have much impact for the examples shown in the figure, but the consequences could be dire for other situations when the phase correlation surfaces have more noise, or when the phase correlation peak is additionally diminished for other reasons.

New Method to Improve Estimation of Reliability

Previously, a sinc model was justified for the phase correlation peak signal. For a pure sub-pel motion (dx, dy) with no integer component, the ideal sinc model for the peak is written as $$p[x,y;dx,dy] = \text{sinc}(x-dx)\text{sinc}(y-dy), \qquad (4)$$

where (x, y) are integer indices, and dx and dy are each in the range [−½, ½]. The sinc function is defined as $$\text{sinc}(x) = \begin{cases} 1, & x = 0 \\ \frac{\sin(\pi x)}{\pi x} & \text{else} \end{cases}$$

For no sub-pel motion, (dx, dy)=(0,0), and p[x,y; 0,0] is a discrete impulse centered at (0,0). Real phase correlation surfaces are corrupted versions of the ideal surface of Equation (4). The model for the actual observed phase correlation surface is $$s[x,y] = Ap[x-x_m, y-y_m; dx, dy] + N[x,y], \qquad (5)$$

where A is the amplitude of the peak, $(x_m, y_m)$ is the integer component of the motion, (dx, dy) is the subpel component of the motion, and N[x,y] is an additive noise term.

The new method of estimating motion vector reliability is defined according to the following:

1. Perform motion estimation (as described previously) to estimate the integer component of the motion for the best peak $(x_0,y_0)$, and its sub-pixel component $(dx_0, dy_0)$.

2. In the neighborhood of the peak located at position $(x_0,y_0)$, apply the following filter to s[x,y]:

$$p_R[x,y;dx_0,dy_0] = K_R p[x,y;dx_0,dy_0],$$

where the normalization constant $K_R$ is $$K_R = \frac{1}{\sum p^2[x, y, dx_0, dy_0]}$$

Applying the filter $p_R[x,y; dx_0,dy_0]$ measures how well the peak neighborhood matches the expected shape of the phase correlation peak. The resulting filtered surface is denoted $s_p[x,y; dx_0,dy_0]$.

3. Compute the reliability according to this modified version of Equation (1):

$$\text{reliability} = 1 - \frac{s[x_1, y_1]}{s_p[x_0, y_0; dx_0, dy_0]}, \quad (6)$$

where $(x_1, y_1)$ is the position of the second-best peak. Filter $p_R[x,y; dx_0, dy_0]$ is the same as $p[x,y; dx_0, dy_0]$ from Equation (4), but with a normalizing factor $K_R$. The particular choice of normalization factor allows the output value $s_p[x_0, y_0; dx_0, dy_0]$ to be the least-squares estimate for the 2D sinc amplitude A in Equation (5), which is a much better indication of the signal strength than the single value $s[x_0, y_0]$.

It is important to make a distinction between the filter $p_R[x,y; dx_0, dy_0]$ and an interpolation filter. A sinc-based interpolation filter would have coefficients that appear similar to the filter coefficients $p_R[x,y; dx_0, dy_0]$. However, such a sinc-based interpolation filter would have a different normalization constant. For an interpolation filter, the normalizing constant would be chosen to give a DC gain of one, which would indicate that the normalizing factor be $$K_{interp} = \frac{1}{\sum p[x, y; dx_0, dy_0]},$$

which differs from $K_R$ in the power of "2" in the denominator.

In Equation (6), the filter $p_R$ is applied only for the best peak $(x_0, y_0)$. It is also possible to apply the filter $p_R[x,y; dx_1, dy_1]$ for the secondary peak value $s[x_1, y_1]$ from Equation (1). In such a case, the reliability measure becomes:

$$\text{reliability} = 1 - \frac{s_p[x_1, y_1; dx_1, dy_1]}{s_p[x_0, y_0; dx_0, dy_0]}.$$

In practice, only a relatively small portion of the filter $p_R[x,y; dx_0, dy_0]$ is used. In some embodiments, the filter is truncated to a 3×3 window, a 4×4 window, a 5×5 window or another size window. FIG. 9 shows several examples of how the filter is applied to the neighborhood of a peak. The subpel motions in FIG. 9 are estimated according to the subpel method introduced previously.

As seen in FIG. 9, more dramatic increases in filtered peak value are present when the sub-pixel motion is at its largest (0.5, 0.5), while small or no increases are present when the sub-pixel motion is close to (0.0, 0.0). This is good, since the old reliability measure in Equation (1) performed well for integer pixels, and the new reliability measure does not affect this much. However, the old reliability measure in Equation (1) performed less well for large sub-pixel displacements; the new reliability of Equation (6) is therefore improved for these cases.

Table 1 compares the examples from FIG. 9 with a similar sinc-based interpolating filter, which uses $K_{interp}$ instead of $K_R$. Although the interpolated peak values are bigger than the original peak values, note that the filters from FIG. 9 give bigger output values than do the interpolating filters. Bigger values are possible from the filters in FIG. 9 because of the theoretically justified assumption that the peak is sinc shaped (which allows a least-squares estimate of the amplitude), while simple interpolating filters do not make assumptions about the shape of the peak.

TABLE 1

Comparison of filtering results between those of FIG. 9 (whose filters used $K_R$) with similar filters that interpolate (and hence use $K_{interp}$).

| Original Peak Value, s[x₀, y₀] | Filtered with $K_R$ Normalizing Factor | Filtered with $K_{interp}$ Normalizing Factor |
|---|---|---|
| 0.43 | 0.88 | 0.59 |
| 0.69 | 0.87 | 0.79 |
| 0.98 | 0.99 | 0.98 |

Two-Pass Phase Correlation to Eliminate Sub-Pel Motion Bias

Sub-pel motion bias is a small error of non-zero mean, which is able to affect sub-pixel motion estimates. In general, it comes from one of two sources:

1. Translational motions that are large relative to the FFT window size. This type of bias increases with the magnitude of the true motion, and is due to the decaying nature of phase correlation peak amplitudes.

2. Rotational motion combined with translational motion. Combined rotational-translational motion is able to be modeled as two separate components: one component that is purely rotational about the block center, and one component that is purely translational. In motion estimation methods that match entire blocks (such as full-search block matching), the rotational component averages to zero. However, phase correlation does not match entire blocks, but rather compares two fixed windows. Therefore, when both translation and rotation occur together, the rotational component visible to the phase correlation windows does not average to zero. The result is a small bias in the motion that the phase correlation estimates.

The two forms of sub-pel motion bias have one fundamental property in common: both are due to the incomplete overlap between two input image windows subject to translational motion. When the translational shift between the input windows is close to zero, the sub-pel bias is not present. If the translational shift is reduced between the input windows, then the bias is removed as well.

Two-pass phase correlation solves the problem, and is performed as follows:

1. Perform the first pass: Perform normal phase correlation to get the integer component of motion $(x_0, y_0)$, which corresponds to the biggest peak in the phase correlation surface s[x,y]. It is not necessary to compute the sub-pel component of motion.

2. Perform the second pass:
   a. Offset the window in the reference picture according to the motion determined in the first pass, $(x_0, y_0)$. This generates a new reference window $f_2[x,y]$ to use in the second pass of phase correlation.
   b. Perform normal phase correlation using the original current window g[x,y] and the offset reference window $f_2[x,y]$. An intermediate result is a second phase correlation surface $s_2[x,y]$. Compute the sub-pel motion estimates $(dx_a, dy_a)$ based on this second phase correlation surface. Note the following for the second pass:
      i. It is not necessary to re-compute G[m,n], the FFT of the current block, because it is unchanged relative to the first pass.
      ii. It is not necessary to re-perform peak finding, because the integer component of motion was already determined in the first pass. Thus, it is able to be assumed that the peak in $s_2[x,y]$ is located at or very near the origin (0,0).

c. The final motion estimate is then the sum of the offset and the sub-pel estimate: $(x_0+dx_a, y_0+dy_a)$.

Using two-pass phase correlation eliminates the effect of sub-pixel error bias.

Figure 10:
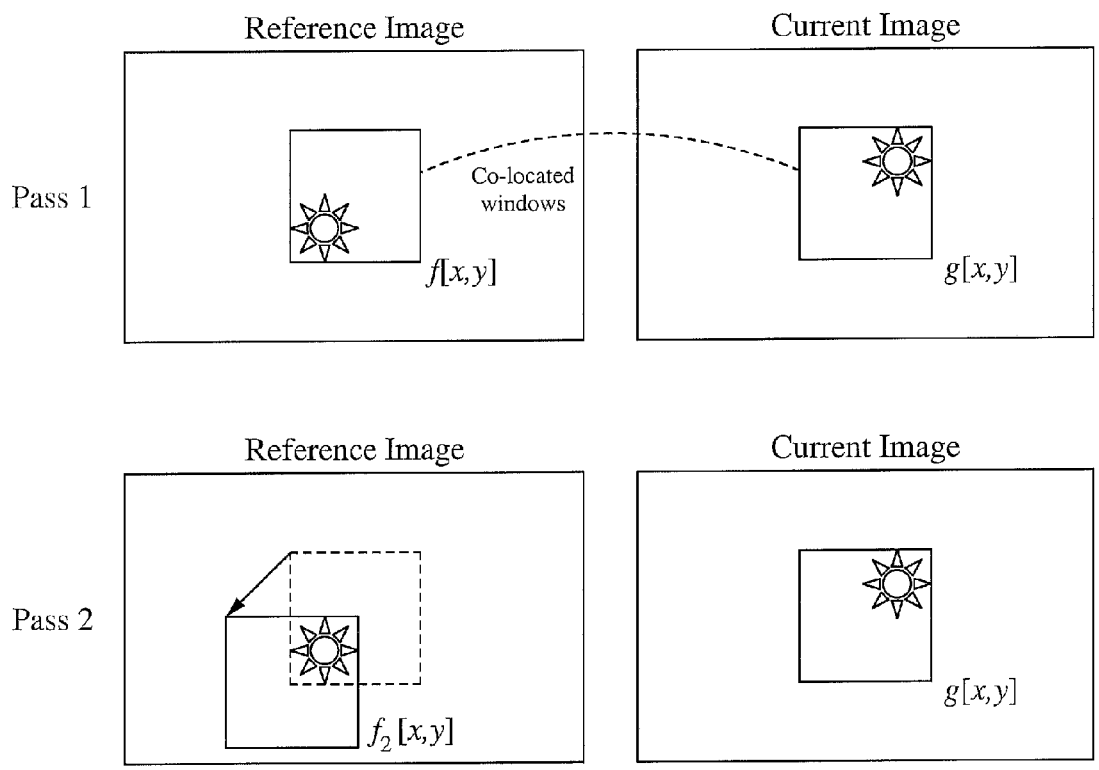
FIG. 10 illustrates examples of window positions for two-pass phase correlation.
Figure 11:
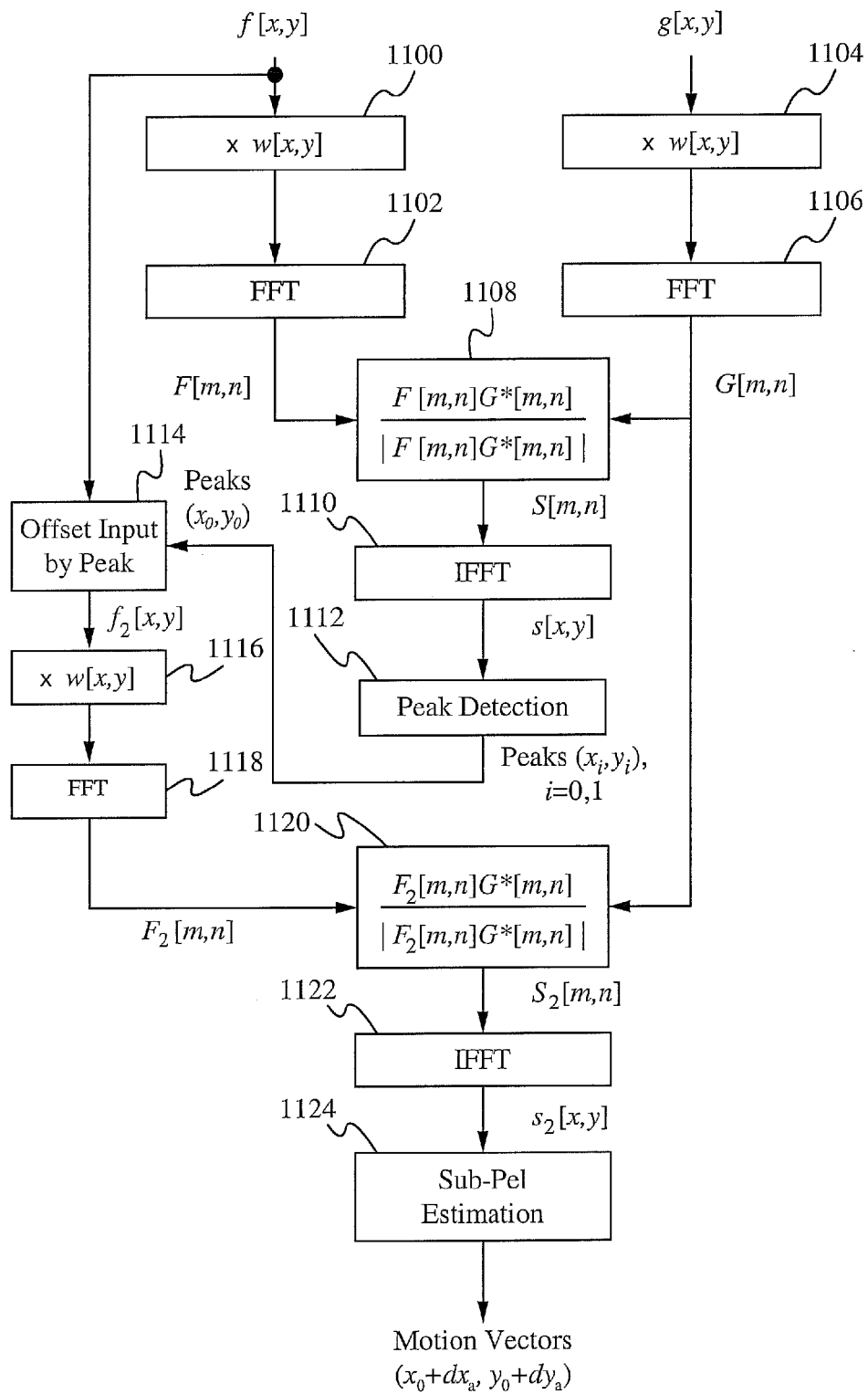
FIG. 11 illustrates a flowchart of phase correlation according to some embodiments.

FIG. 10 illustrates the procedure pictorially, while FIG. 11 shows a block diagram of the procedure. Although FIG. 11 does not explicitly show the reliability measure (as was shown in FIG. 7), it is straightforward to compute a reliability measure using techniques previously discussed with one or more of the following: s[x,y], $s_2$[x,y], peaks $(x_0,y_0)$ and $(x_1, y_1)$ and the final sub-pel motion estimates.

FIG. 11 illustrates a flowchart of phase correlation according to some embodiments. In the step 1100, point-wise multiplication of the N×N window in the reference frame with window function w[x,y] is performed. In the step 1102, a Fast Fourier Transform (FFT) is applied to the result, which yields the complex values F[m,n]. In the step 1104, point-wise multiplication of the N×N window in the current frame is performed with the window function w[x,y]. In the step 1106, a FFT is applied to the result, which yields the complex values G[m,n]. In the step 1108, in the normalization stage, the following equation is computed:

$$S[m, n] = \frac{F[m, n]G^*[m, n]}{|F[m, n]G^*[m, n]|},$$

where * denotes the complex conjugate, and | | represents the magnitude of the complex argument. In the step 1110, the inverse FFT (IFFT) of S[m,n] is computed to yield s[x,y], the phase correlation surface. In the step 1112, the K biggest peaks are identified from the phase correlation surface. The indices of these peaks correspond to possible motions that are present between the N×N windows in the current and reference frames. The indices of these peaks are denoted as $(x_i, y_i)$, i=0, ..., K−1. The indices are positive integers in 0, 1, ..., N−1. A negative motion of −q leads to a peak at index position N−q.

In the step 1114, a window is offset to generate a new reference window to use. In the step 1116, point-wise multiplication of the N×N offset window of the reference frame with window function w[x,y] is performed. In the step 1118, a Fast Fourier Transform (FFT) is applied to the result, which yields the complex values $F_2$[m,n].

In the step 1120, in the normalization stage, the following equation is computed:

$$S_2[m, n] = \frac{F_2[m, n]G^*[m, n]}{|F_2[m, n]G^*[m, n]|},$$

where * denotes the complex conjugate, and | | represents the magnitude of the complex argument. In the step 1122, the IFFT of $S_2$[m,n] is computed to yield $s_2$[x,y], the phase correlation surface. In the step 1124, the sub-pixel estimate ($dx_a$, $dy_a$) is computed for the peak location at position (0,0). The final motion estimate is the sum of $(x_0,y_0)$ and the subpel estimate.

Figure 12:
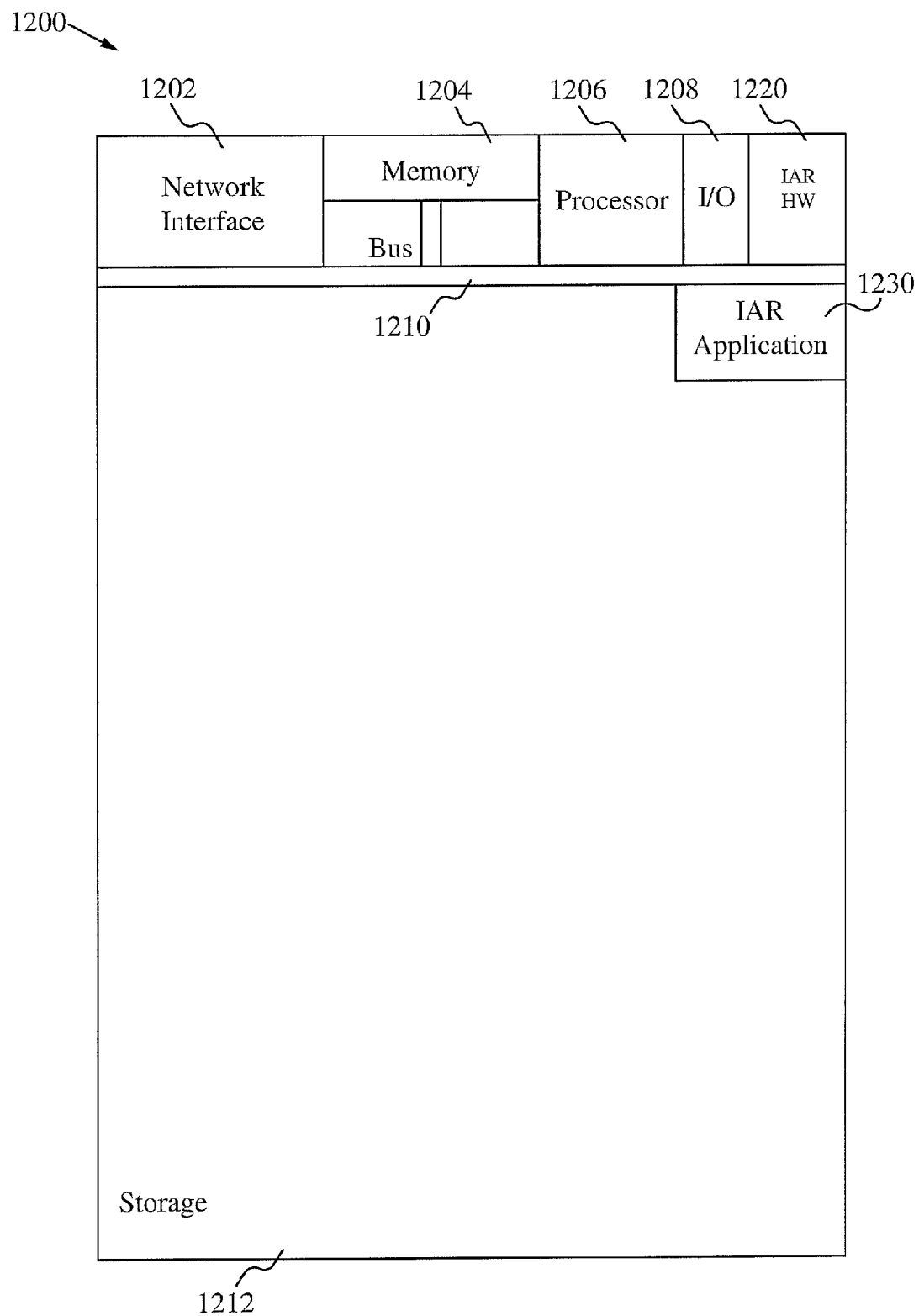
FIG. 12 illustrates a block diagram of an exemplary computing device configured to implement the method to increase the accuracy of phase correlation according to some embodiments.

FIG. 12 illustrates a block diagram of an exemplary computing device 1200 configured to implement the method to improve accuracy and reliability of motion estimated with phase correlation according to some embodiments. The computing device 1200 is able to be used to acquire, store, compute, communicate and/or display information such as images and videos. For example, a computing device 1200 is able to acquire and store an image or a video. The method to improve accuracy and reliability of motion estimated is able to be used when encoding a video on the device 1200. In general, a hardware structure suitable for implementing the computing device 1200 includes a network interface 1202, a memory 1204, a processor 1206, I/O device(s) 1208, a bus 1210 and a storage device 1212. The choice of processor is not critical as long as a suitable processor with sufficient speed is chosen. The memory 1204 is able to be any conventional computer memory known in the art. The storage device 1212 is able to include a hard drive, CDROM, CDRW, DVD, DVDRW, flash memory card or any other storage device. The computing device 1200 is able to include one or more network interfaces 1202. An example of a network interface includes a network card connected to an Ethernet or other type of LAN. The I/O device(s) 1208 are able to include one or more of the following: keyboard, mouse, monitor, display, printer, modem, touchscreen, button interface and other devices. Improved accuracy and reliability application(s) 1230 used to perform the method to improve accuracy and reliability of motion estimation are likely to be stored in the storage device 1212 and memory 1204 and processed as applications are typically processed. More or less components than shown in FIG. 12 are able to be included in the computing device 1200. In some embodiments, improved reliability and accuracy hardware 1220 is included. Although the computing device 1200 in FIG. 12 includes applications 1230 and hardware 1220 for improved reliability and accuracy, the method to improve reliability and accuracy of motion estimation is able to be implemented on a computing device in hardware, firmware, software or any combination thereof.

In some embodiments, the improved reliability and accuracy application(s) 1230 include several applications and/or modules. In some embodiments, the improved reliability and accuracy application(s) 1230 includes modules such as a first window function module for applying a window function to a window of a current frame to obtain a current frame result, a first FFT module for applying a Fast Fourier Transform to the current frame result yielding a first set of complex values, a second window function module for applying the window function to the window of a reference frame to obtain a reference frame result, a second FFT module for applying the Fast Fourier Transform to the reference frame result yielding a second set of complex values, a first normalizing module for normalizing a product of the second set of complex values and a complex conjugate of the first set of complex values, a first IFFT module for computing an inverse Fast Fourier Transform to yield a phase correlation surface, a peak identification module with matched filters for identifying one or more peaks from the phase correlation surface, wherein indices of the peaks correspond to possible motions, a offset module for inputting an offset by a peak, a third window function module for applying a window function to a window of a frame to obtain a frame result, a third FFT module for applying a Fast Fourier Transform to the frame result yielding a third set of complex values, a second normalizing module for normalizing the product of the third set of complex values and the complex conjugate of the first set of complex values, a second IFFT module for computing an inverse Fast Fourier Transform to yield a phase correlation surface and a sub-pixel estimation module for computing sub-pixel estimates for previously identified peaks. In some embodiments, fewer or additional modules and/or sub-modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone, a video player, a DVD writer/player, a Blu-Ray® writer/player, a television, a home entertainment system or any other suitable computing device.

To utilize the method to improve accuracy and reliability of motion estimation with phase correlation, a user displays images or video such as on a digital camcorder, digital camera or television, and while the images or video are displayed, the method to improve accuracy and reliability of motion estimation automatically detects movement better, so that the images or video are displayed smoothly, with less noise, with improved dynamic range, or such that some other desired feature is achieved. The method to improve accuracy and reliability of motion estimation occurs automatically without user involvement. In some implementations, the method to improve accuracy and reliability of motion estimation is used while acquiring images or video.

In operation, the method to improve accuracy and reliability of motion estimation with phase correlation performs phase correlation where a 2D neighborhood of phase correlation peak is approximated with an outer-product of two 1D vector to eliminate the sub-pixel error. Reliability estimation is improved. Additionally, two-pass phase correlation is implemented to eliminate sub-pel motion bias. The result is better motion vector quality, which in turn, generates better images and/or videos.

Some Embodiments of Method to Improve Accuracy and Reliability of Motion Estimated with Phase Correlation 1. A method of performing phase correlation to eliminate sub-pixel motion bias programmed in a memory in a device comprising:
    a. performing a first pass of phase correlation;
    b. offsetting a window in a reference picture using an offset according to motion determined in the first pass;
    c. performing a second pass of the phase correlation using an original current window and the offset reference window to generate a second phase correlation surface;
    d. computing sub-pixel motion estimates based on the second phase correlation surface; and
    e. computing a final motion estimate by summing the offset and sub-pixel estimates.
2. The method of clause 1 wherein performing a first pass of phase correlation further comprises:
    a. applying a window function to a window of a current frame to obtain a current frame result;
    b. applying a Fast Fourier Transform to the current frame result yielding a first set of complex values;
    c. applying the window function to the window of a reference frame to obtain a reference frame result;
    d. applying the Fast Fourier Transform to the reference frame result yielding a second set of complex values;
    e. normalizing a product of the second set of complex values and a complex conjugate of the first set of complex values;
    f. computing an inverse Fast Fourier Transform to yield a phase correlation surface; and
    g. identifying one or more peaks from the phase correlation surface, wherein indices of the peaks correspond to possible motions.
3. The method of clause 2 wherein performing a second pass of phase correlation further comprises:
    a. applying an offset window function to the window of a reference frame to obtain an offset frame result;
    b. applying a Fast Fourier Transform to the offset frame result yielding a third set of complex values;
    c. normalizing a product of the third set of complex values and a complex conjugate of the first set of complex values; and
    d. computing an inverse Fast Fourier Transform to yield a second phase correlation surface.
4. The method of clause 1 further comprising implementing a reliability measure.
5. The method of clause 1 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
6. A system for performing phase correlation to eliminate sub-pixel motion bias programmed in a memory in a device comprising:
    a. a first pass module for performing a first pass of phase correlation;
    b. an offset module for offsetting a window in a reference picture using an offset according to motion determined in the first pass;
    c. a second pass module for performing a second pass of the phase correlation using an original current window and the offset reference window to generate a second phase correlation surface;
    d. a sub-pixel module for computing sub-pixel motion estimates based on the second phase correlation surface; and
    e. a final motion module for computing a final motion estimate by summing the offset and sub-pixel estimates.
7. The system of clause 6 wherein the first pass module further comprises:
    a. a first window function module for applying a window function to a window of a current frame to obtain a current frame result;
    b. a first Fast Fourier Transform module for applying a Fast Fourier Transform to the current frame result yielding a first set of complex values;
    c. a second window function module for applying the window function to the window of a reference frame to obtain a reference frame result;
    d. a second Fast Fourier Transform module for applying the Fast Fourier Transform to the reference frame result yielding a second set of complex values;
    e. a normalizing module for normalizing a product of the second set of complex values and a complex conjugate of the first set of complex values;
    f. an inverse Fast Fourier Transform module for computing an inverse Fast Fourier Transform to yield a phase correlation surface; and
    g. a peak identification module for identifying one or more peaks from the phase correlation surface, wherein indices of the peaks correspond to possible motions.

8. The system of clause 7 wherein the second pass module further comprises:
   a. an offset window function module for applying an offset window function to the window of a reference frame to obtain an offset frame result;
   b. a third Fast Fourier Transform module for applying the Fast Fourier Transform to the offset frame result yielding a third set of complex values;
   c. normalizing a product of the third set of complex values and a complex conjugate of the first set of complex values; and
   d. a second inverse Fast Fourier Transform module for computing the inverse Fast Fourier Transform to yield a second phase correlation surface.
9. The system of clause 6 further comprising a reliability module for implementing a reliability measure.
10. The system of clause 6 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
11. A camera device comprising:
   a. a video acquisition component for acquiring a video;
   b. an encoder for encoding the video, including phase correlation motion estimation, by:
      i. performing a first pass of phase correlation;
      ii. offsetting a window in a reference picture using an offset according to motion determined in the first pass;
      iii. performing a second pass of the phase correlation using an original current window and the offset reference window to generate a second phase correlation surface;
      iv. computing sub-pixel motion estimates based on the second phase correlation surface; and
      v. computing a final motion estimate by summing the offset and sub-pixel estimates; and
   c. a memory for storing the encoded video.
12. The camera device of clause 11 wherein performing the first pass of phase correlation further comprises:
   a. applying a window function to a window of a current frame to obtain a current frame result;
   b. applying a Fast Fourier Transform to the current frame result yielding a first set of complex values;
   c. applying the window function to the window of a reference frame to obtain a reference frame result;
   d. applying the Fast Fourier Transform to the reference frame result yielding a second set of complex values;
   e. normalizing a product of the second set of complex values and a complex conjugate of the first set of complex values;
   f. computing an inverse Fast Fourier Transform to yield a phase correlation surface; and
   g. identifying one or more peaks from the phase correlation surface, wherein indices of the peaks correspond to possible motions.
13. The camera device of clause 12 wherein performing the second pass of phase correlation further comprises:
   a. applying an offset window function to the window of a reference frame to obtain an offset frame result;
   b. applying a Fast Fourier Transform to the offset frame result yielding a third set of complex values;
   c. normalizing a product of the third set of complex values and a complex conjugate of the first set of complex values; and
   d. computing an inverse Fast Fourier Transform to yield a second phase correlation surface.
14. A method of determining sub-pixel motion estimation accuracy with phase correlation programmed in a memory in a device comprising:
   a. approximating a two-dimensional neighborhood of a phase correlation peak with an outer-product of two one-dimensional vectors; and
   b. automatically correcting an incorrect estimated peak location.
15. The method of clause 14 wherein the two-dimensional neighborhood is selected from the group consisting of a 3×3 neighborhood, 4×4 neighborhood and 5×5 neighborhood.
16. The method of clause 14 wherein the two one-dimensional vectors include a column vector corresponding to a vertical sub-pixel motion vector and a row vector corresponding to a horizontal sub-pixel motion vector.
17. The method of clause 14 wherein approximating the two-dimensional neighborhood includes implementing a rank-1 matrix approximation.
18. A method of improving estimation of reliability of motion estimation programmed in a memory in a device comprising:
   a. performing motion estimation to estimate an integer component of motion for a best peak and a sub-pixel component;
   b. applying a filter to measure how a peak neighborhood matches an expected shape of a phase correlation peak; and
   c. computing the reliability of the motion estimation.
19. The method of clause 18 wherein computing the reliability utilizes a second-best peak.
20. The method of clause 18 wherein the filter utilizes a normalizing factor.
21. The method of clause 18 wherein the filter is truncated to one of a 3×3 window, a 4×4 window or a 5×5 window.
22. A method of computing a reliability measure programmed in a memory in a device comprising:
   a. performing motion estimation to estimate an integer component of motion for a best peak and a sub-pixel component of the best peak;
   b. applying a filter to a phase correlation surface in a neighborhood of the best peak; and
   c. computing the reliability measure utilizing the resulting filtered surface.
23. The method of clause 22 wherein the filter implements a normalization constant.
24. The method of clause 22 wherein the computing the reliability uses a position of a second-best peak.
25. The method of clause 22 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.
26. A method of improving sub-pel accuracy of motion vectors programmed in a memory in a device comprising:
   a. determining a two-dimensional neighborhood of a phase correlation peak to be approximated; and b. approximating the two-dimensional neighborhood of the phase correlation peak with an outer-product of two one-dimensional vectors.

27. The method of clause 26 wherein the two-dimensional neighborhood is selected from the group consisting of a 3×3 neighborhood, 4×4 neighborhood and 5×5 neighborhood.

28. The method of clause 26 wherein the two one-dimensional vectors include a column vector corresponding to a vertical sub-pixel motion vector and a row vector corresponding to a horizontal sub-pixel motion vector.

29. The method of clause 26 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of improving estimation of reliability of motion estimation programmed in a memory in a device comprising:

performing motion estimation to estimate an integer component of motion for a best peak and a sub-pixel component;

applying a filter to measure how a peak neighborhood matches an expected shape of a phase correlation peak; and computing the reliability of the motion estimation by dividing a first result of a filter applied to a second-best peak by a second result of the filter applied to the best peak.

2. The method of claim 1 wherein the filter utilizes a normalizing factor.

3. The method of claim 1 wherein the filter is truncated to one of a 3×3 window, a 4×4 window or a 5×5 window.

4. A method of computing a reliability measure programmed in a memory in a device comprising:

performing motion estimation to estimate an integer component of motion for a best peak and a sub-pixel component of the best peak;

applying a filter to a phase correlation surface in a neighborhood of the best peak; and computing the reliability measure utilizing the resulting filtered surface by dividing a first result of a filter applied to a second-best peak by a second result of the filter applied to the best peak.

5. The method of claim 4 wherein the filter implements a normalization constant.

6. The method of claim 4 wherein the device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPhone, an iPod®, a video player, a DVD writer/player, a Blu-ray® writer/player, a television and a home entertainment system.

* * * * *